Nov. 15, 1960  W. F. NEWBOLD  2,959,960
MEASURING APPARATUS INCLUDING TEMPERATURE
COMPENSATING MEANS
Filed June 7, 1956

*INVENTOR.*
WILLIAM F. NEWBOLD
BY Arthur H. Swanson
ATTORNEY.

United States Patent Office 2,959,960
Patented Nov. 15, 1960

2,959,960

MEASURING APPARATUS INCLUDING TEMPERATURE COMPENSATING MEANS

William F. Newbold, Ambler, Pa., assignor to Minneapolis-Honeywell Regulator Company, Minneapolis, Minn., a corporation of Delaware Filed June 7, 1956, Ser. No. 589,933

8 Claims. (Cl. 73—361)

The present invention relates to measuring apparatus, and more particularly to measuring apparatus of the type wherein means are provided for automatically compensating for variations in the ambient temperature.

In the art relating to measuring apparatus it is frequently necessary to provide means for compensating for variations in the ambient temperature. Failure to do so would introduce an error into the final measurement. This is particularly true when the measuring instrumentality is a thermocouple. Heretofore measuring systems have been provided wherein a slide-wire potentiometer constitutes an important element in the measuring apparatus. In such systems, ambient temperature or cold-junction compensation is achieved through the use of a network involving temperature responsive resistors and standard reference cells. Arrangements of this type require that the cold-junction of the thermocouple be positioned as near as possible to the temperature sensitive resistor in an effort to assure that the resistor and the cold junction will be subjected, as nearly as practicable, to the same variations in temperature. Because the temperature compensation is electrical in nature, the cold-junction of the thermocouple cannot be placed in physical contact with the compensating resistor to thereby assure positively that the two elements will be subjected to the same temperature variations. Other measuring systems which have a means of compensating for ambient temperature included therein, include such complexities as to render them impractical.

Another disadvantage of the slide-wire systems lies in the fact that the compensating means includes mechanically movable elements which are in frictional contact, hence, subject to wear. Others have introduced problems which did not exist in the uncompensated systems.

It is accordingly an object of the present invention to provide an improved measuring apparatus featuring improved means for compensating for variations in ambient temperature and which obviates many of the difficulties of the prior devices.

It is another object of the present invention to provide an improved measuring apparatus wherein an initial bias is applied to the measuring apparatus and that initial bias is varied in accordance with variations in ambient temperature.

It is a further object of the present invention to provide an improved measuring apparatus as set forth wherein the means for varying the initial bias is in physical contact with and may also constitute the cold junction of a measuring thermocouple.

A still further object of the present invention is the provision of an improved measuring apparatus as set forth which is relatively free from frictionally engaged wearing elements.

In accomplishing these and other objects, there has been provided, in accordance with the present invention, a measuring thermocouple which produces a voltage signal representative of a variable to be measured. A biasing means is provided which produces a voltage proportional to the initially applied bias. This second voltage is superimposed upon the signal voltage from the thermocouple in a direction to be additive. This bias voltage may be produced as a function of the position of a beam which is biased in one direction by a spring. The tension in the spring may be varied, as a function of changes in ambient temperature, by a bimetallic element to which one end of the spring is coupled. To provide a self-balancing measuring system, a further voltage signal is developed which is applied to oppose the first two mentioned voltages. Means are also provided for detecting any difference existing between the opposing voltages and applying that difference voltage as a correction signal to vary the magnitude of the last mentioned opposing voltage to establish the desired balance.

A better understanding of this invention may be had from the following detailed description when read in connection with the accompanying drawing, in which.

Figure 1:
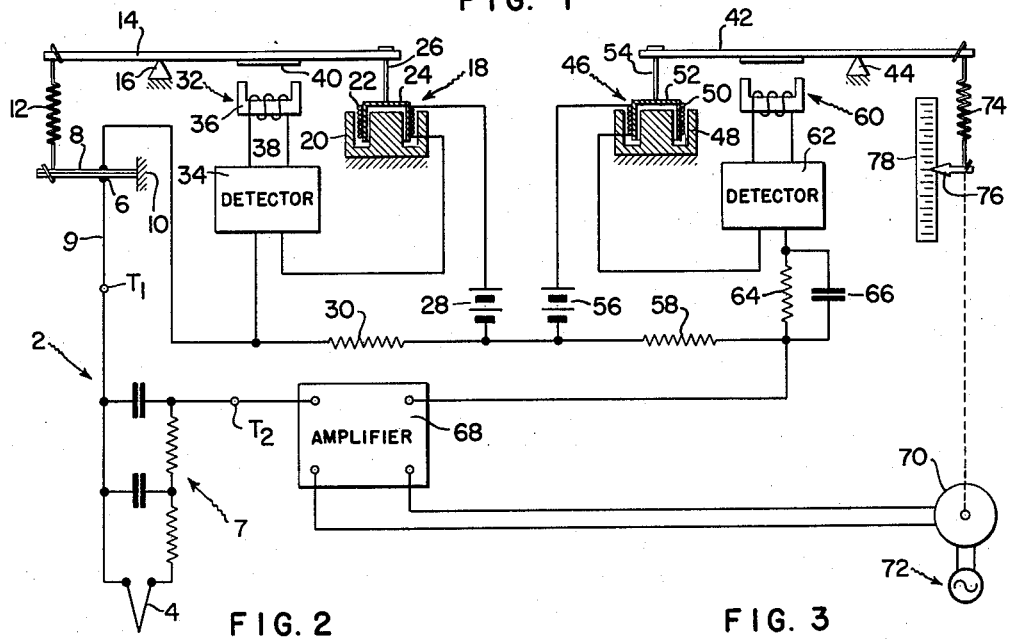
Fig. 1 is a schematic representation of one embodiment of the present invention.

Referring now to the drawing in more detail, there is shown in Fig. 1 a system for carrying out the present invention. This system includes a thermocouple 2 which has a hot-junction 4 and a cold-junction 6. An R-C filter network 7 is provided to filter out alternating current stray signals and also to provide a desirable damping or anti-hunting action as described in the Harrison and Wills Reissue Patent 23,121. A pair of input terminals $T_1$ and $T_2$ are arranged for connection to the thermocouple 2 whereby to couple the thermocouple to the circuitry of the measuring apparatus. The lead 9 constitutes a thermocouple extension lead, that is, it is made of the same material as the one side of the thermocouple to which it is arranged to be connected. With this arrangement the cold-junction is extended up to and included in a bimetallic element 8. One end of the bimetallic element 8 is secured to a fixed mounting 10. The other end of the bimetallic element 8 is engaged by one end of a biasing spring 12. The other end of the biasing spring 12 applies a biasing force to one end of a balance beam 14 which is pivoted about a fulcrum 16. An opposing force is applied to the opposite end of the beam 14 by a magnetic member 18.

The magnetic member 18 includes a core member 20 which is permanently magnetized and fixedly mounted. Associated with the core member there is a moving coil 22 which is supported on a suitable form 24 and which is, in turn, secured by a connecting link 26 to the end of the beam 14. The coil 22 is incorporated in an electrical circuit which includes a power source represented by a battery 28, a load resistor 30, and a current modifying arrangement. The current modifying arrangement includes a variable impedance element 32 and an associated detector circuit 34. The current modifying arrangement may suitably be an arrangement of the type shown in copending application of William J. Popowsky and Robert P. Adams, entitled "Measuring Apparatus," Serial No. 507,704, filed May 16, 1955. Such an arrangement will be more fully described subsequently in connection with the description of Fig. 3. For the present, however, it is sufficient to state that the current flowing through the circuit including the load resistor 30, the battery 28, and the coil 22 is varied in accordance with the position of the beam 14, as sensed by the variable impedance element 32. This variable impedance element 32 includes a core member 36, having suitable magnetic properties, which is magnetically coupled to an associated coil 38. An auxiliary core element 40 is positioned on the beam 14 to provide means for varying the air gap defined by the ends of the core member 36 in accordance with the position of the beam 14. Varying the air gap in this manner produces an accompanying variation in the impedance of the variable impedance element 32. This variation in impedances is converted, by the detector circuit 34, into a corresponding variation in current in the circuit which includes the coil 22. The current, thus controlled, flowing through the coil 22, produces a magnetic field which reacts with the field produced by a permanent magnet core to produce a force on the beam 14 to oppose the force of the bias spring 12. For any particular bias applied to the beam by the spring 12, a particular direct current will flow in the circuit of the magnetic member 18. This current produces a unique voltage signal across the resistor 30.

The thermocouple 2 is connected in an electrical circuit which includes the load resistor 30. The circuit is so arranged that the voltage signal developed by the thermocouple is superimposed additively on the voltage signal developed across the resistor 30. These two voltages comprise an adjusted signal voltage which is the summation of the signals from the measuring thermocouple and a signal representative of the initial bias applied to the system by the biasing spring 12.

There is provided a second balance beam 42 which is balanced about a fulcrum 44. A force is applied to one end of the balance beam 42 by a magnetic member 46. This magnetic member 46 is similar to the magnetic member 18 previously mentioned and includes a permanently magnetized core member 48 and a movable coil 50. This coil 50 is mounted on a suitable coil form 52 which is, in turn, coupled to the end of the beam 42 by a connecting link 54. An energizing circuit for the magnetic member 46 includes a power source in the form of a battery 56, a load resistor 58, and a current modifying arrangement, similar to that previously discussed. This current modifying arrangement includes a variable impedance element 60 and an associated detector circuit 62. There is also included in this circuit an R-C damping network which includes a resistor 64 and a shunt capacitor 66. The current flowing in this latter circuit flows through the coil 50 setting up a magnetic field which reacts with the field developed by the core member 48 to apply a downward force on the beam 42. This current is again controlled by the current modifying arrangement in accordance with the position of the beam 42. This current flowing through the load resistor 58 produces a voltage signal which is of a magnitude comparable to the adjusted signal voltage previously mentioned.

The electrical circuit which includes the thermocouple and the load resistor 30 also includes the load resistor 58. This circuit is so arranged that the voltage signal developed across the load resistor 58 is coupled in opposition to the adjusted signal voltage resulting from the summation of the signal voltages from the thermocouple and the load resistor 30. The resultant of these voltage signals is applied to the input of an amplifier 68. This amplifier 68 may be of the type which is shown and described in Patent No. 2,423,540 issued to W. P. Wills. Any resultant signal voltage, which is indicative to a lack of balance between the adjusted signal voltage and the opposing balancing voltage, is applied to the input of the amplifier 68. This amplifier converts the direct current signal into an alternating signal which is applied as a control signal to one winding of a two phase motor 70. The other winding of the motor 70 is supplied from a standard source 72. This motor 70 is coupled to one end of a spring 74, the other end of which is connected to the end of the beam 42 opposite from the magnetic member 46. The unbalance signal from the amplifier is applied to the motor 70 to cause the motor to rotate to vary the tension in the spring 74. The variation in the tension in the spring produces a corresponding variation in the position of the beam 42.

The direction of the change of the position of the beam 42 is such as to modify the current flowing in the associated circuit to reestablish a balance between the adjusted signal voltage and the voltage developed aross the resistor 58. The change in the current in that circuit changes the magnetic force operating, through the agency of the magnetic member 46, on the end of the beam 42. This change in force on the end of the beam 42 leaves a remaining force just sufficient to balance the force applied to the opposite end of the beam by the tension in the spring 74.

The spring 74 is coupled to a pointer 76 which is associated with an indicating scale 78. The position of the pointer along the scale is indicative of the tension in the spring 74. The scale may be calibrated in terms of the units of variation of the variable being measured by the hot junction 4 of the thermocouple 2. It should be apparent that variations in the signal voltage developed by the thermocouple will result in a variation in the position of the pointer 76 with respect to the scale 78 since variations in the signal voltage will require a compensating variation in the balancing voltage signal and, hence, produce a variation in the tension of the spring 74.

The signal voltage developed by the thermocouple is, as is well known, a function of the difference in temperature of the hot junction and the cold junction. If the cold junction can be maintained at a constant temperature, then variations in the hot junction will produce a truly representative voltage signal. However, in practical applications, it is usually most difficult to maintain the cold junction at a constant temperature. Usually the cold junction is exposed to the ambient temperature which may, from time to time, vary. Such variations in the temperature of the cold junction would produce a corresponding change in the relative temperature of the hot junction with respect to the cold junction. This results in a change in the output voltage signal which is not indicative of a change in the temperature of the variable being measured. Accordingly, means are provided for compensating for the variations in the cold junction temperature. In the instant case, a bimetallic cantilever 8 is provided which may be made of the same materials as the thermocouple and which constitutes the cold junction 6 of the thermocouple 2. The bimetallic cantilever 8 thus serves two functions. One, it is itself the cold junction; and, two, it provides the means for effecting the desired compensation for variations in the temperature of the cold junction. By combining these two functions into a single element, special care to maintain the cold junction at the same temperature as the compensating means is not required. The bimetallic cantilever 8 is so arranged that an increase in the cold junction temperature will increase the tension in the spring 12. Increasing this tension increases the initial bias applied to the system and correspondingly increases the voltage signal developed across the load resistor 30. Thus, it may be seen that while an increase in the cold junction temperature would cause a corresponding decrease in the thermocouple output voltage, the bias voltage would be simultaneously increased providing the desired compensation for the variation in the cold junction temperature.

Figure 2:
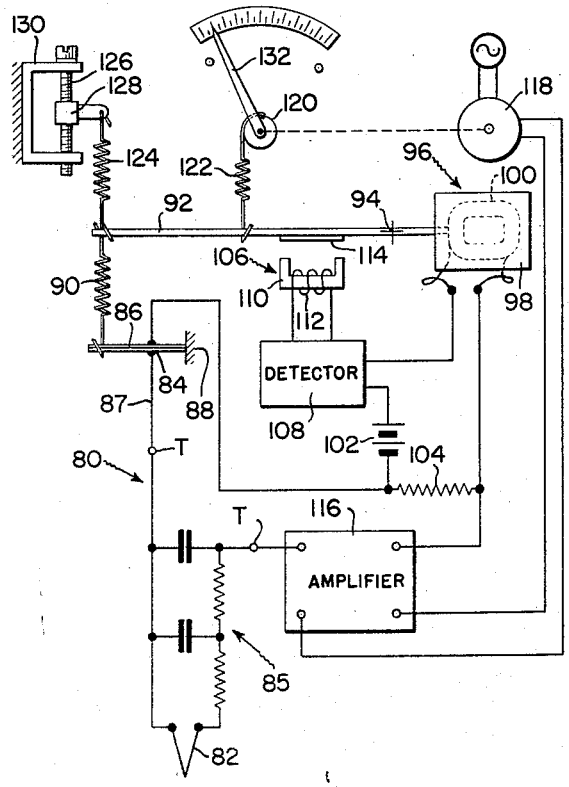
Fig. 2 is a schematic representation of a different arrangement of elements which also embodies the present invention.

A somewhat similar arrangement is shown in Fig. 2. In that figure there is shown a thermocouple 80 which is provided with a hot junction 82 and a cold junction 84. Here, too, an R-C filter network 85 is provided to filter out stray alternating current signals and to provide the damping action as previously mentioned. The cold junction 84 is extended up to and included in a bimetallic element 86, similar to the bimetallic element 8 shown in Fig. 1, from the input terminal T by means of the thermocouple extension lead 87. One end of the bimetallic element is secured to a fixed mounting member 88. The other end of the bimetallic element 86 is connected through a biasing spring 90 to one end of a balance beam 92. The beam 92 is pivoted about a pivot member 94 and carries a magnetic member 96 on the opposite end from the bias spring 90. The magnetic member 96 is arranged to apply a force to the associated end of the beam 92 which opposes the force applied by the bias spring 90 on the opposite end.

The magnetic member is provided with a permanently magnetized magnetic field producing member 98 and a movable coil member 100. The coil is fixed to the end of the beam 92 and is included in an electrical circuit which supplies exciting current thereto. This circuit includes the source of power represented by battery 102, a load resistor 104, and a current modifying device which includes a variable impedance member 106 and an associated detector circuit 108. The variable impedance member 106 includes a core member 110 having suitable magnetic properties and an associated coil 112 wound thereon. The beam 92 carries an auxiliary core element 114 which is moved toward or away from the core member 110 in accordance with variations of the position of the beam 92. The electric currents flowing in the circuit just described flows through the coil 100 to produce a magnetic field which reacts with the magnetic field produced by the field producing means 98. The reaction of the two fields produces a force on the end of the beam 92 which is a function of the magnitude of the current flowing in the coil 100.

As described in connection with the apparatus shown in Fig. 1 a voltage signal, which is a function of the difference in temperature between the hot and cold junction, is produced by the thermocouple. An electrical circuit is arranged to connect the thermocouple in series with the load resistor 104. The current flowing through the first mentioned circuit which includes the coil 100 produces a voltage signal across the load resistor 104. The circuits are so arranged that the voltage signal across the load resistor 104 is superimposed upon the voltage signal from the thermocouple 80. The resultant of these two voltage signals is applied to the input of an amplifier 116. This amplifier may again be an amplifier of the type described in the aforementioned Wills patent. If the two voltage signals sum to zero, no signal will be applied to the input of the amplifier. If, on the other hand, there is a difference between the two voltage signals, this difference will be applied as input signal to the amplifier 116.

The output of the amplifier is applied as a control signal to the two phased motor 118, energizing the same. The energization of the motor 118 causes rotation of the armature thereof which, in turn, drives the drum 120. The drum is coupled by a spring 122 to a point on the beam 92. The rotation of the drum 120, through the operation of the motor 118, causes a change in the tension in the spring 122. This produces a corresponding change in the forces acting upon the beam 92. The unbalance of the forces acting on the beam permit the beam to move to reestablish a balance of the forces acting thereon. The movement of the beam produces a corresponding change in the impedance of the variable impedance member 106. The detector circuit 108 converts this change in impedance into a corresponding change in the current flowing in the associated circuit producing a corresponding change in the current flowing through the coil 100. The change in the current flowing in that circuit is accompanied by a change in the voltage signal developed across the load resistor 104. The change in the voltage signal across this load resistor will be in a direction to reduce the difference in the magnitude of that voltage signal and the voltage signal produced by the thermocouple until the two are equal.

A variable suppression spring 124 is coupled to the end of the beam 92 adjacent to the biasing spring 90. The other end of the suppression spring is coupled to an adjustable member which may be in the form of a screw 126 and nut arrangement 128 carried by a fixed yoke 130. This arrangement provides an initial suppression which must be overcome before the voltage produced by the thermocouple is effective to produce a movement of the indicator pointer 132 which is attached to the drum 120.

In this apparatus it may be seen that an initial bias is applied to the beam 92 by the bias spring 90. If the ambient temperature changes to produce a decrease in the effective temperature difference between the hot and the cold junctions, the same change in temperature produces a flexure of the bimetallic element 86 to vary the amount of the initial bias by an amount to compensate for the change in temperature difference. For example, an increase in the force applied to the beam by the tension spring as a result of the flexing of the bimetallic element tends to move the beam in a counter-clockwise direction, as shown in the illustrated embodiment. This produces an accompanying variation in the impedance of the variable impedance member 106. The corresponding change in the exciting current flowing through the coil 100 changes the force applied to that end of balance between the forces acting on the beam. The change in current also produces a corresponding change in the voltage signal appearing across the load resistor 104. This change in voltage signal across the load resistor 104 will be in a direction to compensate for the corresponding change in the voltage signal from the thermocouple which change was produced by the variation in the temperature of the cold junction 84. Here again it may be seen that the unitary construction of the bimetallic element which functions as the cold junction, considerably alleviates the problem of maintaining the cold junction and the cold junction compensating means at the same temperature. It will be appreciated that the "span" or range of response of either of the foregoing devices may be determined by the ohmic resistance of the load resistors 58 or 104, respectively. One principal difference may be noted, however, the value of the resistor 58, in the system shown in Fig. 1, controls only the span. That is, the span control is independent of any other function or adjustment. On the other hand, the value of the resistor 104, in the apparatus illustrated in Fig. 2, controls not only the span, but also the zero adjustment as well.

Figure 3:
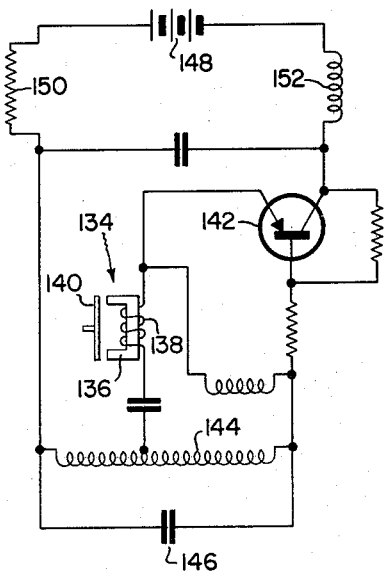
Fig. 3 is a schematic circuit diagram of a suitable detector circuit which may be used as an element of the present invention.

In Fig. 3 there is shown a schematic diagram of a circuit which is suitable for use in the present invention and is illustrative of one form of detector circuit which may be used to convert the variable impedance of the variable impedance devices 32, 60, and 106 into variations in current. A variable impedance device 134 is illustrated which includes a substantially U-shaped core member 136 having suitable magnetic properties. A coil 138 is wound onto the core member 136. An auxiliary core member 140 is movably supported and arranged to vary the air gaps in the magnetic path defined by the core elements. An oscillator is provided which includes a semi-conductive amplifier member 142 and inductance member 144 and a capacitor 146. The coil of the variable impedance member is included in the load circuit of the oscillator. Variations in the inductive impedance of the variable impedance member 134 produces a corresponding variation in the current supplied to the oscillator from the supply circuit which includes a power source represented by a battery 148 and a load resistor 150. The battery, of course, corresponds to any of the batteries 28, 56, or 102 while the load resistor corresponds to any of the load resistors 30, 58 and 104. The coil of the magnetic members is illustrated in Fig. 3 as the coil 152. From this it may be seen that the changes in the impedance in the oscillator load circuit, which produces a change in the current supplied to the oscillator from the power source, produces a corresponding change in the current flowing through both the coil 152 and the load resistor 150.

Thus there has been provided, in accordance with the present invention, an improved measuring apparatus which features means for compensating for variations in the ambient temperature which is relatively simple in structure and in operation, and which includes means for applying an initial bias to the system of the measuring apparatus, which bias is variable in response to variations in ambient temperature.

What is claimed is:

1. In measuring apparatus for use in measuring the voltage signal developed by a thermocouple, said thermocouple having a hot-junction for exposure to a variable to be measured and a cold-junction for exposure to ambient temperature, the improvement comprising means responsive to said voltage signal for indicating the status of said variable, spring bias means for imparting an initial bias to said signal responsive means, and thermally responsive means coupled to said spring bias means to vary the tension in said spring bias means in accordance with variations in ambient temperature, said thermally responsive means constituting the cold junction of said thermocouple.

2. In measuring apparatus for use in measuring the voltage signal developed by a thermocouple having a hot-junction for exposure to a variable to be measured and a cold-junction for exposure to ambient temperature, the improvement comprising mechanically movable means responsive to said voltage signal for indicating the status of said variable, spring bias means for imparting an initial mechanical bias to said signal responsive means, and thermally responsive means coupled to said spring bias means to vary the tension in said spring bias means in accordance with variations in ambient temperature, said thermally responsive means constituting said cold-junction of said thermocouple.

3. In a measuring system, a thermocouple for developing a voltage signal representative of a variable to be measured, said thermocouple having a hot-junction for exposure to said variable and a cold-junction for exposure to ambient temperature, variable means including a movable element for developing a second voltage signal in opposition to said first voltage signal, means responsive to differences between said first mentioned and said second voltage signals to vary said second voltage signal to establish a balance between said two voltage signals, mechanical biasing means for imparting an initial bias to said movable element, and thermally responsive means coupled to said biasing means to vary said initial bias in accordance with changes in ambient temperature, said thermally responsive means constituting said cold-junction.

4. In a measuring system, a thermocouple for developing a voltage signal representative of a variable to be measured, said thermocouple having a hot-junction for exposure to said variable to be measured and a cold-junction for exposure to ambient temperatures, means for developing a second voltage signal electrically connected in opposition to said first mentioned voltage signal, means responsive to differences between said first and second voltage signals to produce a signal representative of said differences, movable means movable in response to signals from said last mentioned means, means coupled to said movable means to vary said second voltage signal to establish a balance between said two voltage signals, indicator means coupled to said movable means for indicating the position of said movable means as a measure of said variable, mechanical biasing means coupled to impart an initial mechanical bias to said movable means, and thermally responsive means coupled to said biasing means for varying said initial bias in accordance with changes in ambient temperature, said thermally responsive means constituting said cold-junction of said thermocouple.

5. A measuring apparatus comprising a thermocouple having a hot junction and a cold junction for developing a voltage signal representative of a variable to be measured, mechanical biasing means for imparting an initial mechanical bias to said apparatus, means including a mechanical movable element responsive to said biasing means for developing a bias voltage signal representative of said initial mechanical bias, circuit means connected to superimpose said bias voltage signal on said first mentioned voltage signal in augmentation thereof, means for developing a balancing voltage signal, circuit means connected to superimpose said balancing voltage signal on said first two mentioned voltage signals in opposition thereto, means responsive to the resultant of said voltage signals to vary said balancing voltage signal to establish a balance between said balancing voltage signal and the sum of said first two mentioned voltage signals, and thermally responsive means coupled to said mechanical biasing means to vary said initial mechanical bias in accordance with changes in ambient temperature, said thermally responsive means constituting said cold junction of said thermocouple.

6. A measuring apparatus comprising a thermocouple for developing a voltage signal representative of a variable to be measured, said thermocouple having a hot-junction for exposure to said variable and a cold-junction for exposure to ambient temperatures, mechanical biasing means for imparting an initial mechanical bias to said apparatus, means including a mechanically movable element responsive to said biasing means for developing a bias voltage signal representative of said initial mechanical bias, circuit means connected to superimpose said bias voltage signal on said first mentioned voltage signal in augmentation thereof, means for developing a balancing voltage signal, circuit means connected to superimpose said balancing voltage signal on said first two mentioned voltage signals in opposition thereto, movable means responsive to the resultant of said voltage signals to vary said balancing voltage signal to establish a balance between said balancing voltage signal and the sum of said first two mentioned voltage signals, indicator means coupled to said movable means for indicating the position of said movable means as a measure of said variable, and thermally responsive means coupled to said mechanical biasing means to vary said initial mechanical bias in accordance with changes in ambient temperature, said thermally responsive means constituting said cold-junction of said thermocouple.

7. A measuring apparatus comprising a thermocouple for developing a voltage signal representative of a variable to be measured, said thermocouple having a hot-junction for exposure to said variable and a cold-junction for exposure to ambient temperature, a first balance beam, a biasing spring coupled to said beam to impart an initial bias force on said beam, electromagnetic means coupled to said beam to apply a force opposing said bias force, electrical circuit means for energizing said electromagnetic means, sensing means responsive to the position of said beam coupled to control the flow of energizing current in said circuit through said electromagnetic means to balance said forces, impedance means included in said circuit to develop a second voltage signal proportional to said current, circuit means connected to superimpose said second voltage signal on said first mentioned voltage signal in augmentation thereof to produce an adjusted voltage signal, further circuit means for developing a balancing voltage signal, connection means for superimposing said balancing voltage signal on said adjusted signal voltage in opposition thereto, means including a movable member responsive to differences between said adjusted voltage signal and said balancing voltage signal to vary said balancing voltage to establish a balance between said adjusted voltage signal and said balancing voltage signal, indicator means coupled to said movable member for indicating the position of said movable member as a measure of said variable, and a thermally responsive bimetallic member coupled to said biasing spring to vary said initial bias in accordance with changes in ambient temperature.

8. The invention as set forth in claim 7 wherein said bimetallic member constitutes said cold junction of said thermocouple.

References Cited in the file of this patent

UNITED STATES PATENTS

| | | |
|---|---|---|
| 1,539,542 | Wilson | May 26, 1925 |
| 1,564,933 | Brown | Dec. 8, 1925 |
| 1,643,668 | Linblad | Sept. 27, 1927 |
| 2,312,022 | Brooks | Feb. 23, 1943 |
| 2,614,163 | Roper | Oct. 14, 1952 |
| 2,757,539 | Broomell | Aug. 7, 1956 |

FOREIGN PATENTS

| | | |
|---|---|---|
| 394,025 | Great Britain | June 22, 1933 |
| 1,009,045 | France | Feb. 27, 1952 |